United States Patent [19]

Nawrocki

[11] Patent Number: 5,072,615

[45] Date of Patent: Dec. 17, 1991

[54] APPARATUS AND METHOD FOR GAUGING THE AMOUNT OF FUEL IN A VEHICLE FUEL TANK SUBJECT TO TILT

[75] Inventor: Ryszard Nawrocki, Inkster, Mich.

[73] Assignee: Ford Motor Company, Dearborn, Mich.

[21] Appl. No.: 628,749

[22] Filed: Dec. 17, 1990

[51] Int. Cl.$^5$ .................. G01F 23/00; H01H 35/18
[52] U.S. Cl. ......................... 73/291; 33/366
[58] Field of Search ............... 73/290 R, 291 V, 305, 73/308; 340/440, 450, 450.2; 33/366, 390

[56] References Cited

U.S. PATENT DOCUMENTS

| | | | |
|---|---|---|---|
| 3,164,023 | 1/1965 | Holderer | 33/366 X |
| 4,402,048 | 8/1983 | Tsuchida et al. | 364/442 |
| 4,470,296 | 9/1984 | Kobayashi et al. | 73/113 |
| 4,535,627 | 8/1985 | Prost et al. | 73/290 |
| 4,547,972 | 10/1985 | Heidel et al. | 33/366 |
| 4,562,732 | 1/1986 | Kitagawa et al. | 73/291 |
| 4,603,484 | 8/1986 | Strothman | 33/366 |
| 4,610,165 | 9/1986 | Duffy et al. | 73/317 |
| 4,744,247 | 5/1988 | Kaminski | 73/313 |
| 4,760,736 | 8/1988 | Huynh | 73/430 |
| 4,768,377 | 9/1988 | Habelmann et al. | 73/313 |
| 4,890,491 | 1/1990 | Vetter et al. | 73/290 R |
| 4,907,451 | 3/1990 | Fleetham | 73/291 |
| 4,912,646 | 3/1990 | Cerruti | 73/308 X |
| 4,967,181 | 10/1990 | Iizuka et al. | 73/290 R X |

FOREIGN PATENT DOCUMENTS

| | | | |
|---|---|---|---|
| 1952869 | 4/1971 | Fed. Rep. of Germany | 33/396 |
| 2032110 | 4/1980 | United Kingdom | 33/366 |
| 2110374 | 6/1983 | United Kingdom | 33/366 |

Primary Examiner—William A. Cuchlinski, Jr.
Assistant Examiner—G. Bradley Bennett
Attorney, Agent, or Firm—Jerome R. Drouillard; Roger L. May

[57] ABSTRACT

A vehicle fuel tank gauging apparatus is disclosed comprising sensor means for measuring the amount of fuel in the tank, electronic memory means for storing a signal indicative of the amount, inclinometer means for detecting whether the vehicle is level, and a microprocessor which allow the fuel amount signal to be transmitted to a fuel gauge when the vehicle is level within a predetermined tolerance. The fuel level information is stored in the memory of the microprocessor and displayed on the fuel gauge only when the vehicle attains the next level condition. Thus, the fuel gauge reading is not effected by vehicle tilt or acceleration. Alternatively, the degree to which the vehicle is askew to the reference plane is measured, and a correction factor corresponding to the degree of tilt is applied to the fuel amount signal to calculate a corrected fuel amount signal.

12 Claims, 2 Drawing Sheets

5,072,615

APPARATUS AND METHOD FOR GAUGING THE AMOUNT OF FUEL IN A VEHICLE FUEL TANK SUBJECT TO TILT

TECHNICAL FIELD

This invention relates to apparatus for gauging the amount of fuel remaining in vehicle fuel tanks.

BACKGROUND ART

Devices for measuring the amount of fuel remaining in a vehicle fuel tank are well known in the automobile industry. A frequent problem facing such devices is that the fuel tank is constantly subject to tilt, such as when the vehicle is accelerating, braking, cornering, or absorbing shock from the roadways over which it travels. Thus, the surface of the fuel in the tank is constantly jostled, and any instantaneous measurement of the amount of fuel in the tank contains some degree of error.

One approach to this problem has been the use of averaging, whereby several measurements are taken over time, and then averaged to obtain an approximate fuel level reading. For example, U.S. Pat. No. 4,402,048 to Tsuchida et al., issued Aug. 30, 1983, discloses a method and apparatus for sampling the amount of fuel over time, eliminating any abnormal values detected which might correspond to changes in attitude of the vehicle, and computing the average fuel level from the remaining values. U.S. Pat. No. 4,470,296 to Kobayashi et al., issued Sept. 11, 1984, teaches a variation of the averaging technique whereby the sampling times over which fuel measurements are taken are increased when the fuel is unstable.

A drawback to averaging, however, is that it is imprecise. By definition, averaging techniques and devices calculate a value from a set of disparate measurements, and thus do not give the actual amount of fuel remaining in the tank.

Accordingly, it is an object of the invention to provide a fuel level gauging apparatus which will improve fuel gauge accuracy.

Another object of the invention is to provide a fuel level gauging apparatus which updates the display indicating the amount of fuel remaining only if the vehicle is tilted less than a predetermined value.

Another object of the invention is to provide a fuel level gauging apparatus which updates the display indicating the amount of fuel remaining only if the vehicle is substantially level and not accelerating or decelerating.

Another object of the invention is to provide a fuel level gauging apparatus which updates the display with a corrected signal which is calculated by applying a correction factor corresponding to the degree to which the fuel tank is askew to a reference plane to a signal received from a fuel remaining sensor.

A more specific object of the invention is to provide a fuel level gauging apparatus which updates the fuel display at least twice per minute.

Another specific object of the invention is to provide a method of gauging an amount of liquid fuel remaining in a vehicle fuel tank which improves fuel gauge accuracy.

SUMMARY OF THE INVENTION

The apparatus and method of the present invention provide increased accuracy in measuring the fuel remaining in a vehicle fuel tank by incorporating an inclinometer into the fuel gauging apparatus and allowing a signal from a fuel amount sensor to be transmitted to a fuel gauge or display only when the vehicle is tilted less than a predetermined degree. To accomplish this, a signal from the fuel sensor is passed through to the display by a microprocessor only when the vehicle is substantially level and not accelerating or decelerating. When the level condition is met, the signal indicative of the amount of fuel left in the tank is stored in the microprocessor memory and displayed on the fuel gauge, and is updated again when the vehicle reaches the next level condition. Alternatively, a correction factor matrix stored in the memory can be applied to the signal received from the fuel sensor to calculate a corrected signal indicative of the amount of fuel remaining in the fuel tank.

The present invention is capable of differentiating between a level condition in which the fuel tank is substantially horizontal, and an unlevel condition in which the fuel tank is momentarily askew to the horizontal. The apparatus comprises sensor means for measuring the amount of fuel in the tank and for generating an output signal indicative of the amount, inclinometer means for detecting the condition of the fuel tank relative to the horizontal and for generating an output signal indicative of the degree to which the fuel tank is askew to the horizontal, electronic memory means for storing the signal indicative of the amount of fuel in the tank, a microprocessor for accepting the signals from the sensor means and from the inclinometer means and for resetting the electronic memory means with the signal indicative of the amount of fuel in the tank only if the signal from the inclinometer means is less than a predetermined valve, and a fuel gauge operatively coupled to the microprocessor for displaying the amount of fuel in the tank as stored in the electronic memory means. The inclinometer means can generate either a single output signal when the fuel tank is level, a binary signal wherein one condition corresponds to level and another condition to unlevel, or a signal indicative of the degree to which the fuel tank is askew to the horizontal.

These and other objects, features and advantages of the present invention will be more apparent from the following description and drawings.

BEST MODE FOR CARRYING OUT THE INVENTION

Figure 1:
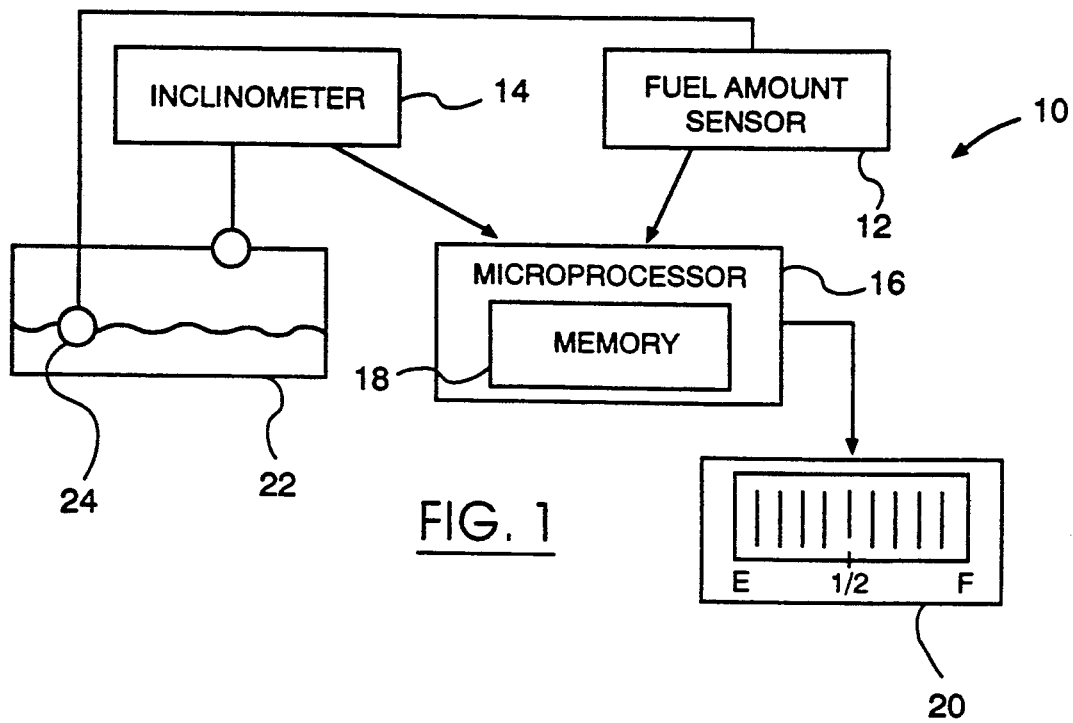
FIG. 1 is a schematic diagram of an apparatus for gauging an amount of liquid fuel remaining in a vehicle fuel tank according to the present invention.

With reference to the drawings, the preferred embodiments of the present invention will be described. FIG. 1 schematically shows an apparatus generally designated 10 for gauging an amount of liquid fuel remaining in a vehicle fuel tank. The apparatus comprises a sensor 12, an inclinometer 14, a microprocessor 16 including an electronic memory function or element 18, and a fuel gauge or display 20. The apparatus 10 is capable of differentiating between a level condition wherein the vehicle fuel tank 22 is substantially parallel to a reference plane such as a horizontal plane, and an unlevel condition wherein the fuel tank 22 is momentarily askew to the reference plane. Ordinarily, the fuel tank 22 and the fuel therein are temporarily titled at an angle to the reference plane when the vehicle itself is tilted. This commonly occurs, for example, when the vehicle accelerates or decelerates, corners, or travels on an incline.

The sensor 12 may be of any conventional construction, such as a Ford Motor Company fuel level sensor E99F-9A299-AA, and includes a float-type device 24 to measure the amount of fuel in the tank. Alternatively, an electrical resistance-type device can be used to make this measurement. After measuring the remaining fuel, the sensor 12 generates an output signal indicative of that amount.

The inclinometer 14 performs the functions of detecting the condition of the fuel tank 22 relative to the reference plane, and generating an output signal indicative of the degree to which the fuel tank is askew to the reference plane. A commercially available multi-directional inclinometer known as a Dual Axis Clinometer, marketed by Schaevitz Sensing Systems, Inc. of Phoenix, Ariz., can be used for this purpose.

The microprocessor 16 includes electronic memory element 18 for storing the signal received from the sensor 12 indicative of the amount of fuel remaining in the tank 22. Typically, the electronic memory 18 is simply the memory circuits of a standard onboard computer. The microprocessor 16 accepts the signals from the sensor 12 and from the inclinometer 14, and resets the electronic memory 18 with the signal indicative of the amount of fuel in the tank 22 only if the signal from the inclinometer 14 is less than a predetermined value. The microprocessor 16 may be dedicated to this application, or may be a multi-function vehicle computer with the capacity to handle this task.

The fuel gauge 20 is operatively coupled to the microprocessor 16, and displays the amount of fuel in the tank 22 as that value is stored in the electronic memory 18. The fuel gauge 20 is ordinarily mounted on the vehicle dashboard in order to be easily viewed by the vehicle driver. Although fuel measurements are taken almost continually, digital fuel gauges with incremental graduations will not display any change until the fuel level drops one increment. That drop in fuel amount may correspond to a distance traveled, during normal operation, of several miles.

Figure 2:
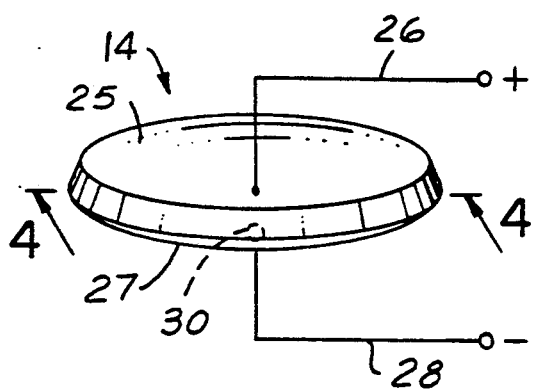
FIG. 2 is a perspective view of a multidirectional inclinometer for use in the apparatus shown in FIG. 1.
Figure 3:
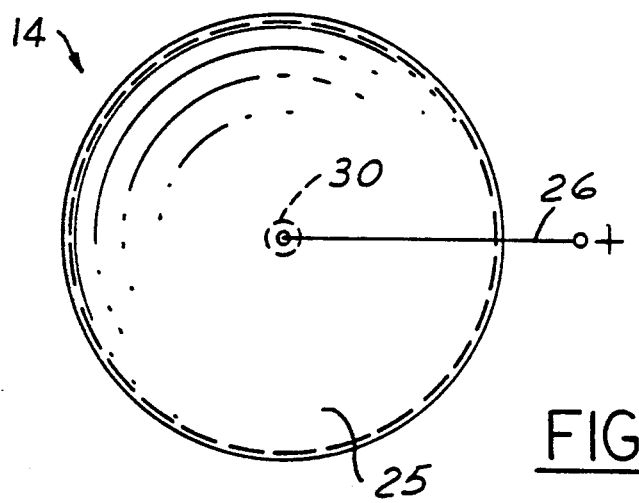
FIG. 3 is a plan view of the multidirectional inclinometer shown in FIG. 2.

In a preferred embodiment of the invention, the microprocessor 16 resets the electronic memory 18 only if the signal from the inclinometer 14 indicates a substantially level fuel tank condition. With reference to FIGS. 2 and 3, the inclinometer 14 of this embodiment is a generally bowl-shaped device having a concave upper portion 25 and a similarly concave lower portion 27 equally spaced therefrom. Electrical lead 26 extends from the focus of the upper portion 25, and another electrical lead 28 extends from the point on lower portion 27 opposite the focus. A circuit is completed when a drop of an electrically conductive material 30 such as mercury in the inclinometer 14, which at all times is in simultaneous contact with upper and lower portions 25 and 27, settles to the bottom of the bowl, and contacts leads 26 and 28. By using this continuous current method, even momentarily level conditions are detected. When power to the inclinometer circuit is switched off, for example when the vehicle is not in operation, no readings at all are passed through.

The inclinometer 14 is multi-directional, i.e. it measures tilt in any direction. Thus, it is effective to measure tilt along the longitudinal axis of the vehicle which may occur during acceleration or braking, along the lateral axis of the vehicle as may occur during cornering, and along any other axis that may occur during travel on an inclined surface. The inclinometer 14 is preferably mounted on the vehicle fuel tank in order to directly measure the tilt of the tank, but it may be positioned at any initially level location in the vehicle. Alternatively, an inclinometer capable of floating on the fuel surface may be placed in the vehicle fuel tank such that the orientation of the fuel surface itself is measured. An advantage of this configuration is that the condition of the fuel surface is measured directly, which may differ from the condition of the tank when the fuel is jostled around inside the tank.

It is preferred that the fuel gauge and output signals produced by the sensor means 12 and the inclinometer 14 are digital, and that the inclinometer 14 generate a single output signal indicative of the level condition of the fuel tank relative to the reference plane. However, the inclinometer 14 may alternatively generate a first output signal indicative of the level condition of the fuel tank relative to the reference plane, and a second output signal indicative of the unlevel condition of the fuel tank.

In another preferred embodiment, the microprocessor 16 is programmed to apply a correction factor matrix to the fuel remaining measurement received from the sensor 12. Assuming a planar fuel surface, the particular correction factor to be applied corresponds to the angle or degree to which the fuel tank 22 is askew to the reference plane. Given the location of the fuel amount measuring device 24 within the tank 22, a corrected signal indicative of the amount of fuel remaining in the tank can be calculated. For example, if the device 24 is located at the front of the tank 22 and the tank 22 is tilted up at its forward end, the device 24 will read an artificially low measurement. By detecting the degree of tilt and applying a correction ratio stored in the memory corresponding to the parameters of tilt and location of the device 24, a more accurate fuel remaining measurement is obtained. In this embodiment, a signal is continually passed to the electronic memory 18 and then to the fuel gauge 20, rather than simply when the level condition is met.

Another alternative embodiment of the apparatus 10 divides the functions performed by the inclinometer between two separate devices. Thus, the apparatus 10 incorporates both an inclinometer to detect the orientation of the vehicle, and an accelerometer to detect whether the vehicle is accelerating or decelerating. Although this arrangement is more complex because the number of signals to be processed is multiplied, it has the advantage of detecting the condition where the vehicle, and hence the fuel tank, are level, but the fuel surface within the tank is not. This situation may occur when the vehicle is accelerating slowly, or when the vehicle has come to a sudden stop but fuel continues to slosh around in the tank.

Figure 4:
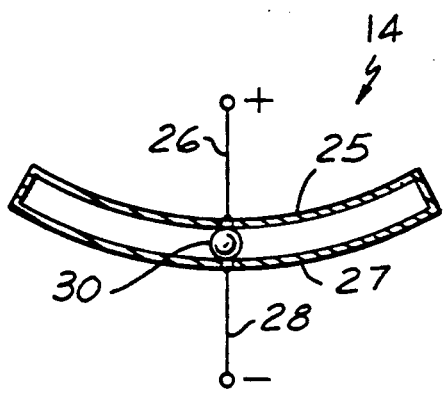
FIG. 4 is a cross-sectional view of the multidirectional inclinometer taken along line 4—4 of FIG. 2.

In FIG. 4 there is shown a cross-section of the inclinometer 14 taken along line 4—4 in FIG. 2. Essentially, a unidirectional inclinometer capable of measuring tilt along only one axis has the shape of the cross-section of the multidirectional inclinometer 14 shown in FIG. 4. Although a unidirectional inclinometer is simpler in construction, operating analogously to a bubble level used in carpentry, it has the obvious drawback that tilt can only be measured along a single axis. Such a unidirectional inclinometer may, however, be effectively placed along the longitudinal axis of the vehicle so that the tilt that occurs during breaking and acceleration may be measured.

Figure 5:
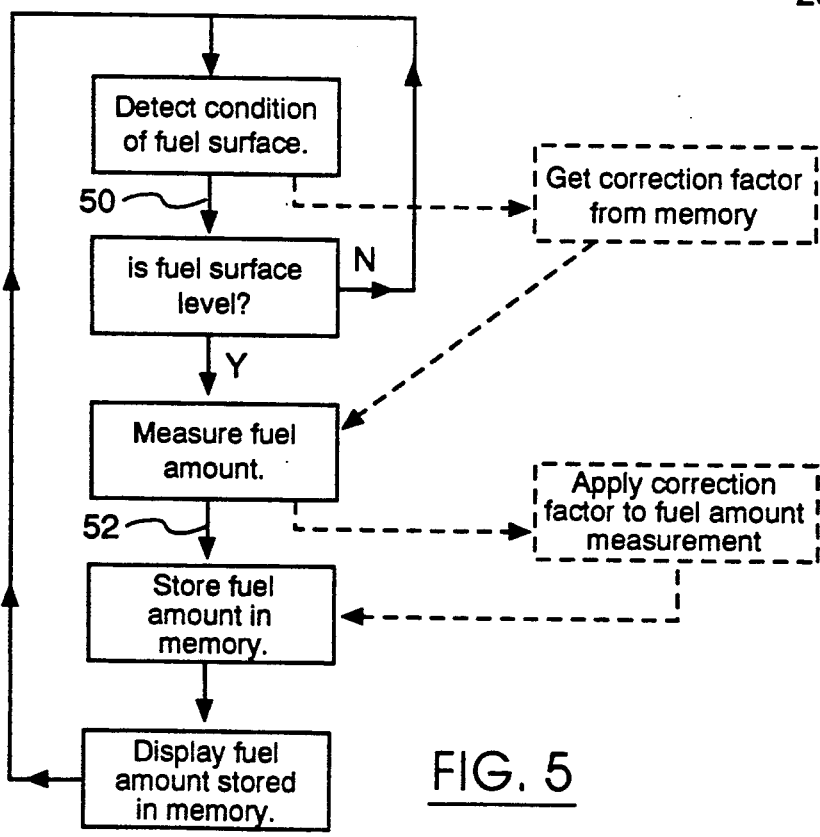
FIG. 5 is an operational flow chart showing the processing steps performed by a microprocessor to determine and display the remaining fuel quantity.

Referring now to FIG. 5, there is shown generally a logic diagram of a method of gauging an amount of liquid fuel remaining in a fuel vehicle fuel tank. This method operates where the fuel alternates between a level condition wherein the fuel surface is substantially parallel to a reference plane, and an unlevel condition wherein the fuel surface is momentarily askew to the reference plane as during acceleration or cornering.

The method comprises detecting the condition of the fuel surface relative to the reference plane, and generating an output signal 50 indicative of the condition. Separately, the amount of fuel in the tank is measured, and an output signal 52 is generated indicative of the amount of fuel in the tank. Upon being supplied with these two signals, the signal indicative of the amount of fuel in the tank is stored in an electronic memory only if the signal indicative of the condition of the fuel surface indicates a level surface condition. The value stored in the electronic memory is then displayed to the vehicle occupant, and the process repeated to continually display the fuel remaining in the tank. Again, the condition of the fuel tank can alternatively be detected to inferentially determine the condition of the fuel surface therein. In the situation where a correction factor is applied, this method is altered simply by substituting two steps for the step of proceeding only if the fuel surface is substantially level. As shown in phantom in FIG. 5, a correction factor is obtained from memory corresponding to the degree to which the fuel surface is askew to the reference plane, and is then applied to the fuel amount measurement.

While the forms of the invention herein shown and described constitute preferred embodiments of the invention, they are not intended to illustrate all possible forms thereof. Further, the words used herein are words of description rather than limitation, and various changes may be made without departing from the spirit and scope of the invention disclosed.

I claim:

1. Apparatus for gauging an amount of liquid fuel remaining in a vehicle fuel tank, said apparatus being capable of differentiating between a level condition wherein the fuel tank is substantially parallel to a reference plane and an unlevel condition wherein the fuel tank is momentarily askew to such reference plane as during acceleration or cornering, the apparatus comprising:

sensor means for measuring the amount of fuel in the tank and for generating a digital output signal indicative of such amount;

inclinometer means for detecting the condition of the fuel tank relative to said reference plane and for generating a digital output signal indicative of the degree to which the fuel tank is askew to said reference plane;

electronic memory means for storing the signal indicative of the amount of fuel in the tank;

a microprocessor for accepting the signals from the sensor means and from the inclinometer means and for resetting the electronic memory means while the vehicle is in motion with a corrected signal indicative of the amount of fuel in the fuel tank, said corrected signal calculated by applying a correction factor corresponding to the degree to which the fuel tank is askew to the reference plane to the signal received from the sensor means; and a fuel gauge operatively coupled to said microprocessor for displaying the amount of fuel in the tank as stored in the electronic memory means.

2. The apparatus of claim 1 wherein said microprocessor resets the electronic memory means only if the signal from the inclinometer means indicates a level fuel tank condition.

3. The apparatus of claim 2 wherein said reference plane is horizontal.

4. The apparatus of claim 2 wherein said inclinometer means includes means for generating a single output signal indicative of the level condition of the fuel tank relative to said reference plane.

5. The apparatus of claim 4 wherein said means for generating a single output signal includes means for producing a digital output signal.

6. The apparatus of claim 2 wherein said inclinometer means includes means for generating a first output signal indicative of the level condition of the fuel tank relative to said reference plane and a second output signal indicative of the unlevel condition of the fuel tank relative to said reference plane.

7. The apparatus of claim 6 wherein said means for generating a first output signal indicative of the level condition and a second output signal indicative of the unlevel condition includes means for producing digital output signals.

8. Apparatus for gauging an amount of liquid fuel remaining in a vehicle fuel tank, said apparatus being capable of differentiating between a level condition wherein the fuel surface is substantially parallel to a reference plane and an unlevel condition wherein the fuel surface is momentarily askew to such reference plane as during acceleration or cornering, the apparatus comprising:

sensor means for measuring the amount of fuel in the tank and for generating a digital output signal indicative of such amount;

inclinometer means for detecting the condition of the fuel surface relative to said reference plane and for generating a digital output signal indicative of such condition;

electronic memory means for storing the signal indicative of the amount of fuel in the tank;

a microprocessor for accepting the signals from the sensor means and from the inclinometer means and for resetting the electronic memory means while the vehicle is in motion with a corrected signal indicative of the amount of fuel in the fuel tank, said corrected signal calculated by applying a correction factor corresponding to the degree to which the fuel surface is askew to the reference plane to the signal received from the sensor means; and a fuel gauge operatively coupled to said microprocessor for displaying the amount of fuel in the tank as stored in the electronic memory means.

9. Apparatus for gauging an amount of liquid fuel remaining in a vehicle fuel tank, said apparatus being capable of differentiating between a level condition wherein the fuel tank is substantially parallel to a reference plane and an unlevel condition wherein the fuel tank is momentarily askew to such reference plane as during acceleration or cornering, the apparatus comprising:

sensor means for measuring the amount of fuel in the tank and for generating a digital output signal indicative of such amount;

inclinometer means for detecting the condition of the fuel tank relative to said reference plane and for generating a digital output signal indicative of such condition;

an accelerometer for detecting the acceleration or deceleration of the vehicle and for generating an output signal indicative of such acceleration or deceleration;

electronic memory means for storing the signal indicative of the amount of fuel in the tank;

a microprocessor for accepting the signals from the sensor means, from the inclinometer means, and from the accelerometer, and for resetting the electronic memory means while the vehicle is in motion with a corrected signal indicative of the amount of fuel in the fuel tank, said corrected signal calculated by applying a correction factor corresponding to the degree to which the fuel tank is askew to the reference plane to the signal received from the sensor means only if the signal from the accelerometer indicates substantially no acceleration or deceleration; and a fuel gauge operatively coupled to said microprocessor for displaying the amount of fuel in the tank as stored in the electronic memory means.

10. Apparatus for gauging an amount of liquid fuel remaining in an automobile gasoline tank, said apparatus being capable of differentiating between a level condition wherein the gasoline tank is substantially parallel to a reference plane and an unlevel condition wherein the gasoline tank is momentarily askew to such reference plane as during acceleration or cornering, the apparatus comprising:

sensor means for measuring the amount of fuel in the automobile gasoline tank and for generating a digital output signal indicative of such amount;

inclinometer means for detecting the condition of the fuel tank relative to said reference plane and for generating a digital output signal indicative of such condition;

electronic memory means for storing a signal indicative of the amount of fuel remaining in the automobile gasoline tank;

a microprocessor for accepting the signals from the sensor means and from the inclinometer means and for resetting the electronic memory means while the vehicle is in motion with a corrected signal indicative of the amount of fuel in the automobile gasoline tank, said corrected signal calculated by applying a correction factor corresponding to the degree to which the automobile gasoline tank is askew to the reference plane to the signal received from the sensor means; and a fuel gauge operatively coupled to said microprocessor for displaying the amount of fuel in the automobile gasoline tank as stored in the electronic memory means.

11. A method of gauging an amount of liquid fuel remaining in a vehicle fuel tank wherein said fuel alternates between a level condition wherein the fuel tank is substantially parallel to a reference plane and an unlevel condition wherein the fuel tank is momentarily askew to such reference plane as during acceleration or cornering, the method comprising:

(1) detecting the condition of the fuel tank relative to said reference plane;

(2) generating an output signal indicative of such condition;

(3) measuring the amount of fuel in the tank;

(4) generating an output signal indicative of the amount of fuel in the fuel tank;

(5) applying a correction factor to the signal indicative of the amount of fuel in the fuel tank to calculate a corrected signal while the vehicle is in motion, said correction factor corresponding to the degree to which the fuel tank is askew to the reference plane;

(6) storing the corrected signal indicative of the amount of fuel in the fuel tank in an electronic memory;

(7) displaying the value stored in the electronic memory; and (8) repeating steps (1) through (7).

12. Apparatus for gauging an amount of liquid fuel remaining in a vehicle fuel tank, said apparatus being capable of differentiating between a level condition wherein the fuel tank is substantially parallel to a reference plane and an unlevel condition wherein the fuel tank is momentarily askew to such reference plane as during acceleration or cornering, the apparatus comprising:

sensor means for measuring the amount of fuel in the tank and for generating an analog output signal indicative of such amount;

inclinometer means for detecting the condition of the fuel tank relative to said reference plane and for generating an analog output signal indicative of the degree to which the fuel tank is askew to said reference plane;

electronic memory means for storing the signal indicative of the amount of fuel in the tank;

a microprocessor for accepting the signals from the sensor means and from the inclinometer means and for resetting the electronic memory means while the vehicle is in motion with a corrected signal indicative of the amount of fuel in the fuel tank, said corrected signal calculated by applying a correction factor corresponding to the degree to which the fuel tank is askew to the reference plane to the signal received from the sensor means; and a fuel gauge operatively coupled to said microprocessor for displaying the amount of fuel in the tank as stored in the electronic memory means.

* * * * *